United States Patent [19]

Arent

[11] 4,149,520

[45] Apr. 17, 1979

[54] PASSIVE SEALED FLAT PLATE SOLAR HEAT COLLECTOR WITH AN ATTACHED REFLECTING PANEL FOR THE COLLECTION, STORAGE, AND RADIATION OF SOLAR HEAT

[76] Inventor: Asa S. Arent, 700 15th St. North, Humboldt, Iowa 50548

[21] Appl. No.: 856,660

[22] Filed: Dec. 2, 1977

[51] Int. Cl.$^2$ ............................................. F24J 3/02
[52] U.S. Cl. .................................. 126/270; 237/1 A
[58] Field of Search ................ 126/270, 271; 237/1 A

[56] References Cited

U.S. PATENT DOCUMENTS

| | | | |
|---|---|---|---|
| 2,595,905 | 5/1952 | Telkes | 126/270 |
| 3,841,302 | 10/1974 | Falbel | 126/271 |
| 3,946,721 | 3/1976 | Keyes et al. | 126/270 |
| 3,955,555 | 5/1976 | Bostrom | 126/270 |
| 4,050,777 | 9/1977 | Peters | 126/270 |

*Primary Examiner*—Kenneth W. Sprague
*Attorney, Agent, or Firm*—Zarley, McKee, Thomte, Voorhees & Sease

[57] ABSTRACT

A passive sealed flat plate solar heat collector with an attached reflecting panel for the collection, storage and radiation of solar heat comprising a modular direct solar heat window unit mounted in the side of a building. The window unit comprises a vertically disposed frame having a lower window unit at the lower end thereof and a pair of upper window units positioned above the lower window unit. A first panel member is hingedly secured at its lower end about a horizontal axis to the frame at the lower end thereof and is movable from a closed position adjacent the lower window unit to an open position. In the closed position, the first panel member protects and insulates the lower window unit. In the open position, the reflective inner surface of the first panel member reflects the rays of the sun into the lower window unit which has a solar heat collector positioned inwardly thereof. The first panel member is adjustably positioned in various positions relative to the lower window unit. A second panel member is hingedly secured about a horizontal axis to the upper end of the frame and is movable from a closed position adjacent the upper window units to an open position. In the closed position, the second panel member protects and insulates the upper window units. The second panel member is adjustably positioned in various open positions to provide varying amounts of shade to the upper window units as required. The solar unit is positioned inwardly of the lower window unit and comprises an elongated, hollow, sealed container extending substantially coextensively with the lower window unit. The container has insulation material covering all but the outward side of the container with the insulation material at the inward side of the container being easily removable to permit the heat storage material within the container to radiate heat into the building as desired.

4 Claims, 5 Drawing Figures

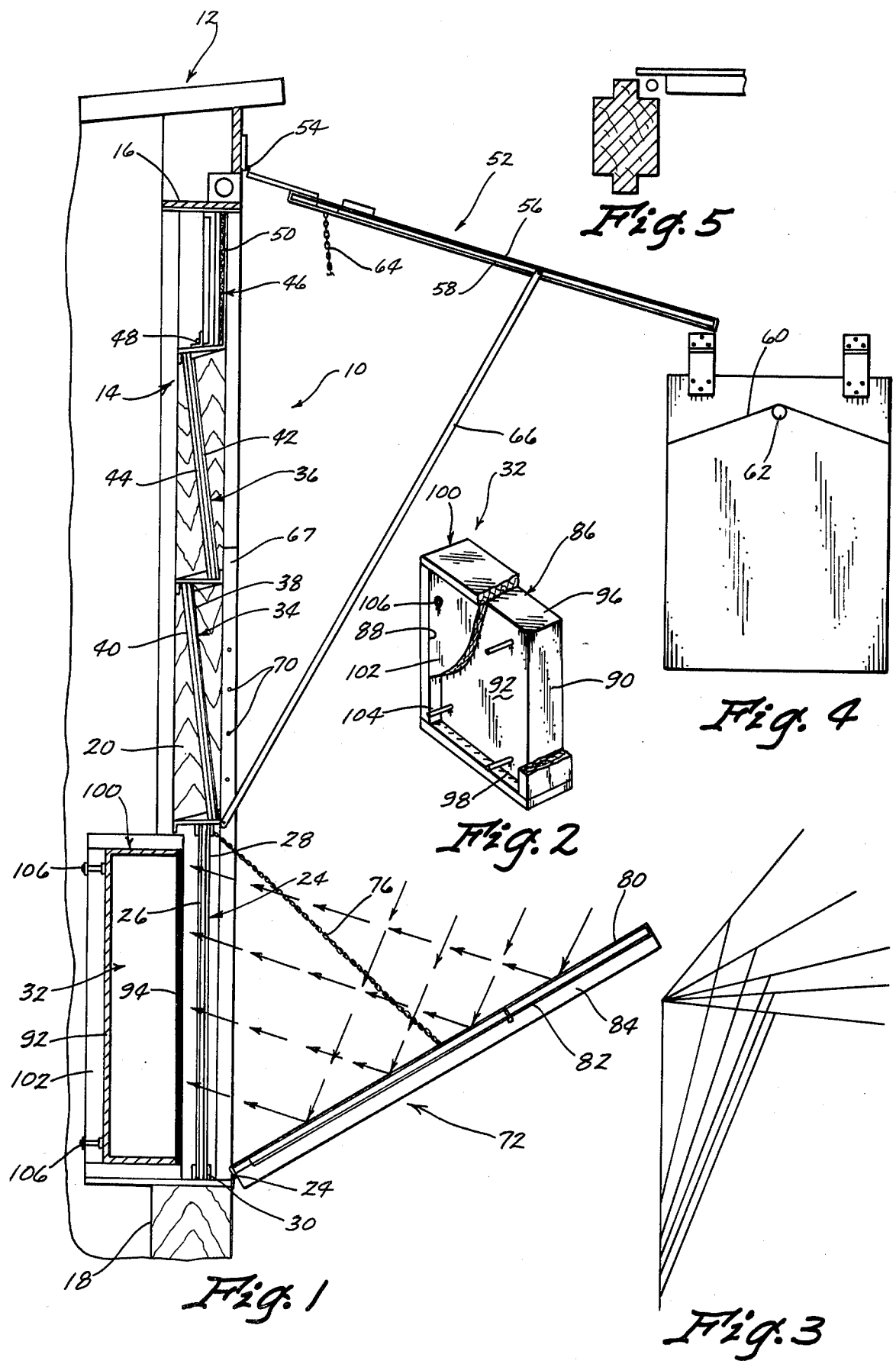

PASSIVE SEALED FLAT PLATE SOLAR HEAT COLLECTOR WITH AN ATTACHED REFLECTING PANEL FOR THE COLLECTION, STORAGE, AND RADIATION OF SOLAR HEAT

BACKGROUND OF THE INVENTION

This invention relates to a solar window unit and more particularly to a passive sealed flat plate solar heat collector with attached reflecting panels for the collection, storage, and radiation of solar heat.

Many solar heat window units have been previously devised but to the best of applicant's knowledge, they all suffer serious disadvantages. Applicant previously described a modular direct solar heat window unit in U.S. Pat. No. 4,043,316 and the instant invention relates to an improved modification thereof.

In applicant's previous device, as described in U.S. Pat. No. 4,043,316, the solar collection unit was connected to conventional piping, etc. to supply the heat therefrom to the interior of the dwelling. In use, the solar collection unit heated the building by re-circulated convection thermo-syphoning by means of ducts immediately below the unit as well as return air ducts in the floor in the north side of the room. These ventilating ducts circulated air through a rock storage bin in the insulated crawl space beneath the floor.

Therefore, it is a principal object of the invention to provide a passive sealed solar flat plate collector, storage and radiant heat unit.

A still further object of the invention is to provide a collector, storage and radiant heat unit which lends itself to installations in trailer homes, modular homes, existing homes, etc.

A still further object of the invention is to provide a collector, storage and radiant heat unit in combination with closable panel members to reflect rays of the sun onto the heat unit at times and to provide a protective means for the heat unit at other times.

A still further object of the invention is to provide a modular direct solar heat window unit having a pair of panel members provided thereon which are easily adjustable positioned relative to the windows of the unit.

A still further object of the invention is to provide a collector, storage and radiant heat unit which may be used to collect heat and store the same during the daylight hours and which may be used to radiate heat into the room during evening hours for heating the room.

A still further object of the invention is to provide a sealed passive solar flat plate collector, storage and radiant heat unit which is economical of manufacture, durable in use and refined in appearance.

BRIEF DESCRIPTION OF THE DRAWINGS

FIG. 1 is a vertical sectional view of the device of this invention mounted in a window unit;

FIG. 2 is a perspective view of the collector, storage and radiant heat unit of this invention;

FIG. 3 is a schematic illustrating the manner in which the rays of the sun are collected onto the heat unit;

FIG. 4 is a plan view of the upper panel member; and

FIG. 5 is a sectional view of the side frame of the window unit.

DESCRIPTION OF THE PREFERRED EMBODIMENT

The numeral 10 refers generally to a modular direct solar heat window unit while the numeral 12 refers to the building in which the unit 10 will be mounted such as a trailer home, modular home, existing building, etc. Unit 10 generally comprises a frame means 14 including upper frame member 16, lower frame member 18, and opposite side frame members 20 and 22 (not shown).

The numeral 24 refers to a lower window unit which comprises a pair of horizontally spaced and vertically disposed window members 26 and 28 which extend between the frame members 20 and 22. Members 26 and 28 are mounted in a frame means referred to by the reference numeral 30. The numeral 32 refers generally to the collector, storage and radiant heat unit of this invention which will be described in more detail hereinafter.

The numerals 34 and 36 refer to upper window units which are secured to and extend between the frame members 20 and 22. Window unit 34 is comprised of a pair of spaced-apart window members 38 and 40 which dwell in an inclined plane relative to vertical so that the upper ends thereof are spaced inwardly relative to the lower ends thereof. Likewise, unit 36 is comprised of spaced-apart window members 42 and 44 which extend between frame members 20 and 22 and which dwell in an inclined plane. An optional ventilating window 46 is provided at the upper end of the frame means 14 and is hingedly secured thereto at 48 to permit the window to be moved from the closed position of FIG. 1 to an open position to allow the circulation of air through the interior of the dwelling. Screen 50 is provided in the frame means outwardly of the ventilating window. If desired, window 46 may be omitted and window 36 modified for ventilation purposes.

Panel member 52 is hingedly secured to the dwelling or frame means by means of a pair of hinges 54. Panel member 52 is provided with a protective outer surface 56 and a reflective inner surface 58. The outer surface 56 of panel member 52 is comprised of plywood, aluminum, etc. while the reflective inner surface may be comprised of a highly reflective material such as polished steel, aluminum, etc. The outer surface 56 of panel member 52 is provided with a V-shaped rain trough 60 extending upwardly therefrom which is adapted to direct moisture thereon towards the drain opening 62 when the panel member 52 has been pivotally moved upwardly greater than 90° from its closed position. A drip chain 64 extends downwardly through the opening 62 so that the water passing through the opening 62 will drip downwardly onto the ground without dripping onto the window units positioned therebelow. A pair of positioning arms 66 and 68 (not shown) are pivotally connected to opposite sides of the panel member 52 and are selectively pivotally adjusted to metal frame members 67 and 69 (not shown) respectively which are secured to frame members 20 and 22 respectively. Frame members 67 and 69 are provided with a plurality of vertically spaced openings 70 which are adapted to receive a pin or the like extending through the lower ends of the arms 66 and 68. If desired, panel member 52 may be positioned by pulleys and ropes and held in position by suitable locking means.

Panel member 72 is pivotally connected at its lower end to the dwelling or frame means 14 at 74. Chain means 76 extends between the panel member 72 and the frame means to permit the panel member 72 to be adjustably positioned in various positions of its angular displacement with respect to the lower window unit and the frame means by means of a hook or the like. The inner surface 80 of panel member 72 is comprised of a highly reflective material so that the rays of the sun striking the reflective surface will be directed through the lower window unit 24 onto the heat unit 32. The outer surface 82 of panel member 72 is covered with a layer of insulation material 84.

The sealed passive solar flat plate collector, storage and radiant heat unit 32 generally comprises an elongated, hollow, sealed container 86 which extends substantially co-extensively with the lower window unit. Container 86 may be constructed of metal, glass or plastic. The container comprises ends 88 and 90, inward side 92, outward side 94, top 96 and bottom 98. As seen in the drawings, outer side 94 is painted black so as to convert the rays of the sun directed thereonto into heat. Insulation material 100 covers all but the outward side of the container. The insulation member 102 which is positioned adjacent the inward side of the container is quickly removably mounted by means of bolts 104 and nuts 106. The unit 86 is preferably filled with water or eutectic salt such as Glauber's salt. Eutectic salt is normally in granular form but liquifies at 75°–105° and acts as an excellent heat collector, storage and radiant medium. Glauber's salt liquifies at 88°–90° F.

During the hot summer months, the panel member 72 would normally be in a closed position. During the hot summer months, the panel member 52 would be pivotally moved upwardly so as to provide shade for the window units 34 and 36.

During the winter months or during those months with cool evenings, the panel member 52 would normally be pivotally moved upwardly beyond the position seen in FIG. 1 so that the reflective inner surface 58 of panel member 52 would cause the rays of the sun striking the same to be reflected downwardly through through the upper two windows 34 and 36. Various solar angles are depicted in FIG. 3. During the winter months, the panel member 72 would also be pivotally moved downwardly to an open position corresponding to the relative position of the sun so that the rays of the sun would be reflected by the reflective inner surface 80 through the lower window unit 24 onto the outer surface 94 of heat unit 86. During the heat collection periods, inner surface 92 is normally covered with the insulation material 102 so that the heat collected by the unit is stored therein and not permitted to escape therefrom. This is especially advantageous when the building does not need heat during sunlight hours but does need heat during evening and nighttime hours. Thus, during the day, heat is collected by the unit 32 and stored therein. As soon as the unit 32 is no longer collecting heat, panel member 72 is pivotally moved to its closed position so that the insulation material on the outer surface thereof serves to insulate the outer surface of the unit 32 to prevent the escape of heat outwardly through the lower window unit.

When heat is required within the building, the insulation material member 102 is removed from the unit 32 so that heat from the unit 32 will radiate into the interior of the room.

If water is employed within the unit 86, suitable connections may be made therefrom to the bathroom or kitchen fixtures. For example, a hose or the like could extend from unit 86 to the water system for such purposes. The transfer of water may be accomplished with either pumps or air pressure.

Thus it can be seen that a novel collector, storage and radiant heat unit has been provided for a window unit which may be easily installed in trailer homes, modular homes, existing dwellings, or the like. It can also be seen that the device of this invention permits maximum utilization of solar energy and permits maximum visibility for the occupants of the dwelling during the summer and winter months.

Thus it can be seen that a device of this invention accomplishes at least all of its stated objectives.

I claim:

1. In combination,
   a building,
   a modular direct solar heat window unit mounted in the side of the building,
   said window unit comprising a vertically disposed frame means having upper and lower ends and spaced-apart sides,
   a lower window unit at the lower end of said frame means,
   at least one upper window unit mounted in said frame means above said lower window unit for visibility,
   a first panel member hingedly secured at its lower end about a horizontal axis to said frame means at the lower end thereof and being movable from a closed position adjacent said lower window unit to an open position, said first panel member having a reflective inner surface,
   first connection means for adjustably positioning said first panel member in various positions relative to said lower window unit whereby the rays of the sun striking said inner surface may be reflected onto said lower window unit,
   and a solar heat collector means positioned inwardly of said lower window unit,
   said collector means comprising an elongated, hollow, sealed container extending substantially co-extensively with said lower window unit,
   said container comprising two ends, outward and inward sides, and a top and a bottom,
   insulation material covering all but said outward side of said container,
   a heat storage material within said container,
   and means for removably mounting said insulation material which covers said inward side of said container whereby, upon removal, said heat storage material radiates heat into said building.

2. The combination of claim 1 wherein first panel member has insulation material positioned adjacent its outer surface for preventing the escape of radiant heat from said collection means when said first panel member is in its said closed position.

3. The combination of claim 1 wherein said storage material comprises water.

4. The combination of claim 1 wherein said storage material comprises eutectic salt.

* * * * *